April 21, 1959 — W. A. HODGES ET AL — 2,883,266
THE PRODUCTION OF SODIUM SILICO FLUORIDE AND
FLUORINE-FREE PHOSPHORIC ACID
Filed June 29, 1956
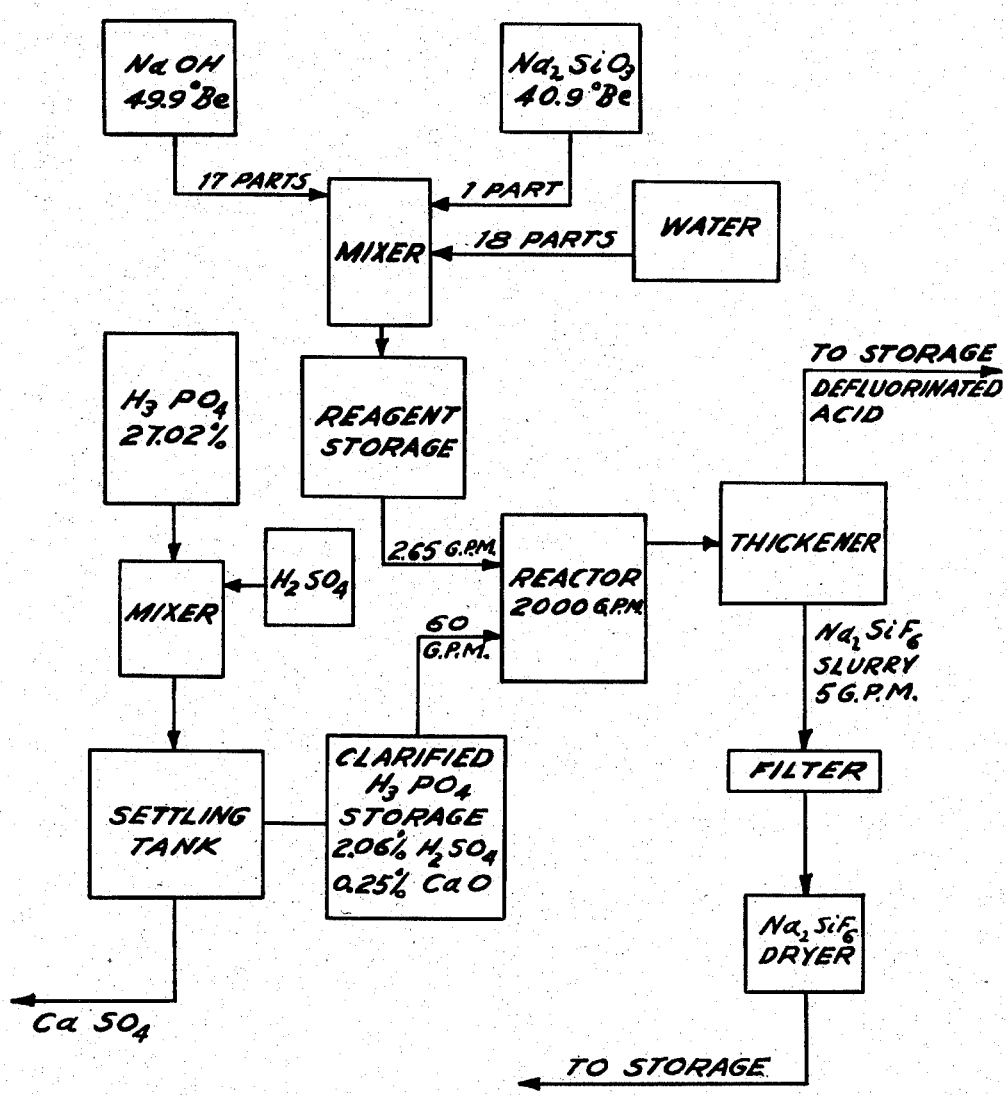
WILLIAM A. HODGES
JOSEPH E. FLOYD
WARREN H. LANG
INVENTORS
BY R. G. Story
ATTORNEY

2,883,266
PRODUCTION OF SODIUM SILICO FLUORIDE AND FLUORINE-FREE PHOSPHORIC ACID

William A. Hodges, Plant City, Joseph E. Floyd, Fort Meade, and Warren H. Lang, Bartow, Fla., assignors to Swift & Company, Chicago, Ill., a corporation of Illinois Application June 29, 1956, Serial No. 594,784

6 Claims. (Cl. 23—88)

This invention relates to a method for the removal of fluorine compounds from phosphoric acid; more particularly, the invention relates to the production of sodium silico fluoride and a relatively fluorine-free phosphoric acid.

There are two general ways of producing phosphoric acid. One is by acidulating phosphate rock with sulfuric acid, commonly known as the "wet" process. The second produces phosphoric acid by a thermo reduction process. The acid produced by the latter method is considerably more concentrated than the acid produced by the former. The acid produced by the "wet" process varies from 25 to 35 percent $P_2O_5$ phosphoric acid. There is considerably less fluorine present in the phosphoric acid produced by the thermo reduction process. In the latter process much of the fluorine is expelled along with other gases by the heat during the reaction or remains in the calcium silicate slag. The phosphoric acid produced by the "wet" process contains quantities of impurities including fluorine and even after purification produces a phosphoric acid suitable only for industrial use. The amount of fluorine present is generally in excess of two percent, usually in the form of hydrofluosilicic acid. In addition, small amounts of sulfates may be present in the crude acid.

By way of contrast, phosphoric acid produced thermally can be used in foods after purification. In the usual method of removing fluorine from crude phopshoric acid produced by the "wet" process, an alkali is added to precipitate some of the fluorine impurities. The alkali can be either sodium carbonate or sodium hydroxide. It has been discovered that the fluorine precipitates as the compound sodium silico fluoride. This material finds use in water treatment for fluoridation, ceramic glazes and laundry uses. In practicing the ordinary alkali precipitation of the fluorine impurities from crude phosphoric acid, the acid is neutralized to a considerable extent producing unwanted sodium phopshate resulting in a waste of phosphoric acid. To keep the formation of sodium phosphate down to a minimum, an amount of alkali is added to the crude phosphoric acid in quantities sufficient to precipitate substantially all of the hydrofluosilicic acid present. This precipitate is unsatisfactory because it is extremely difficult to filter out of the acid. Further, the precipitate is extremely gelatinous with a low rate of crystal growth and a slow settling rate. Sodium compounds other than sodium carbonate and sodium hydroxide have been tried, such as sodium phosphate and sodium sulfate. However, the precipitates resulting all all gelatinous and filtered only with difficulty.

It is therefore an object of the present invention to produce easily filterable sodium silico fluoride, precipitated from crude phosphoric acid made by the "wet" process.

It is another object of the invention to produce a phosphoric acid made by the "wet" process which is relatively free of fluorine impurities.

It is another object of the invention to provide a method for the precipitation of easily filterable sodium silico fluoride from crude phosphoric acid without encouraging the simultaneous formation of sodium phosphate.

Additional objects, if not specifically set forth herein, will be readily apparent to one skilled in the art from the following detailed description of the invention.

This invention contemplates, in general, the addition of sulfate ions, preferably in the form of sulfuric acid, to crude phosphoric acid, to raise the sulfate ion content therein to between about 1.5 and 2.5 percent of the phosphoric acid. Any precipitate that forms may be removed by allowing the precipitate to settle and then decanting off the phosphoric acid. A sodium silicate-sodium hydroxide solution is then added to the clarified phosphoric acid, the amount of sodium hydroxide being between about 0.14 and 0.20 pound per gallon of crude phosphoric acid based on the amount of fluorine impurities and the amount of sodium silicate being between about 0.005 and 0.025 pound per gallon of phosphoric acid. The precipitate, sodium silico fluoride, forms and quickly settles. The precipitate is removed from the phosphoric acid by filtration and is purified by repeated washings with water. The accompanying flow sheet illustrates the entire process, when carried out continuously.

More particularly, in accordance with the invention, the sulfate ion concentration which may be present as sulfuric acid and as calcium sulfate of crude 25–35 percent $P_2O_5$ phosphoric acid is preferably determined, for example by using the gravimetric method outlined in Scott's Standard Method of Chemical Analysis, vol. 1, (5th. ed.), pages 908–909. After the determination has been made, sufficient sulfuric acid is added to bring the concentration of sulfate ions to within 1.5 and 2.5 percent based on the crude phosphoric acid. As the sulfuric acid content is increased, calcium sulfate precipitates. The phosphoric acid is clarified by settling and decantation. After clarification, a solution of sodium silicate and sodium hydroxide is added to phosphoric acid. The amount of sodium hydroxide is approximately the theoretical amount necessary to react with most of the fluorine impurities. Normally the phosphoric acid prepared from Florida phosphate rock uniformly contains somewhat over 2 percent fluorine impurities, often being as high as 2.5 percent. The amount of fluorine impurities may be determined by the method outlined in Florida Land Pebble Phosphate Industry, Methods Used and Adopted by the Association of Florida Phosphate Mining Chemists, 1948 ed., page 28. The amount of sodium hydroxide in pounds is therefore between about 0.14 and 0.20 pound and preferably 0.14 pound per gallon of phosphoric acid. The amount of sodium silicate added is between 0.005 and 0.025 pound per gallon of phosphoric acid present and preferably, 0.005. The crude phosphoric acid and sodium silicate-sodium hydroxide solution is permitted to react for approximately 20 minutes. The resultant mixture is next charged into a settling tank. In the settling tank, sodium silico fluoride crystals settle to the bottom and are removed as a thickened slurry having approximately 25–40 percent solid content. The precipitate is separated from the slurry by filtration and is purified by repeated washings with water. The phosphoric acid filtrate from the filtering step and the phosphoric acid clarified overflow from the settling tank are pumped to a storage tank from which the phosphoric acid can be removed for concentration in a vacuum evaporator. The invention as set forth in brief above may be utilized in a batch process or in a continuous system as outlined in the flow sheet.

One of the purposes for adjusting the sulfate ion concentration to between about 1.5 and 2.5 percent of the crude phosphoric acid is to precipitate most of the calcium compounds that may be present in the crude acid. These calcium compounds are generally in the form of calcium sulfate and to a lesser extent calcium silico fluoride. The quantity of calcium compounds is usually expressed as the calcium oxide (CaO) percentage of the crude phosphoric acid. As the sulfate ion content is increased, the calcium as calcium sulfate becomes less soluble resulting in precipitating the greater part of the calcium ions. This precipitate is preferably removed during the subsequent settling and decantation steps. It is important to adjust the sulfate ion level whereby the resulting phosphoric acid after clarifying contains only about 0.29 percent calcium expressed as CaO. When the sulfate ion content is below this minimum, a larger proportion of calcium compounds are in solution and are decanted with the phosphoric acid. A substantially greater percentage of calcium than .29% remaining in the clarified phosphoric acid has a deleterious effect on the sodium silico fluoride precipitate produced when the sodium hydroxide-sodium silicate reagent is added. The precipitate under these circumstances is flocculent making for difficulty in filtering the sodium silico fluoride out of the phosphoric acid. Not only is the precipitate of a flocculent nature when the sulfate ion concentration is below 1.5 percent but the crystal growth and settling rate is very slow as well. While the upper range in the above was stated to be 2.5 percent of the crude phosphoric acid, this is not to mean that 2.5 percent is the absolute upper limit. As a matter of fact, the concentration can be substantially increased to above 2.5 percent without digressing from the invention. However, the addition of greater amounts of sulfate ions than actually necessary is uneconomical and serves no practical purpose.

The sodium hydroxide of the sodium silicate-sodium hydroxide solution reacts with the hydrofluosilicic acid present in the crude phosphoric acid. When sodium hydroxide solution is used alone to react with the hydrofluosilicic acid a precipitate is formed that is often gelatinuous and consequently difficult to filter. An important step of the invention is the inclusion of a small amount of sodium silicate in the sodium hydroxide solution prior to its use as a precipitatng agent. However, the sodium silicate added is preferably insufficient in quantity to precipitate the fluorine present in the crude phosphoric acid. The solubility of sodium silico fluoride is such that the amount formed from the small amount of sodium silicate added will not precipitate the fluorine impurity. The sodium silicate is, therefore, not included in the reaction for the purpose of using its sodium ions to produce sodium silico fluoride. It is the function of the sodium hydroxide to provide the sodium ions whereby to form sodium silico fluoride. Sodium silicate is an important ingredient in that the proper number of silicate ions insure the production of a readily filterable precipitate. Phosphoric acid produced by the "wet" process already contains sufficient silica to allow the fluorine impurities to be precipitated as sodium silico fluoride when sufficient sodium ions are present. However, this product is not easily filterable unless there are additional silicate ions present. At the same time, the amount of sodium silicate added must be kept below a certain level, otherwise the silicate tends to jell when introduced into the acid unless the mixture of phosphoric acid and sodium silicate is very dilute. Of course, such a dilution is uneconomical since the phosphoric acid after fluorine removal must generally be concentrated by vacuum evaporation. Therefore, even if an attempt is made to operate with a dilute solution, the removal of water during the concentration step causes the formation of a jell.

In the practice of the invention the crude phosphoric acid produced by the wet process should contain at least 1.5 percent sulfate ion concentration before clarifying by settling and decantation. After clarifying, the calcium ion concentration in the phosphoric acid should not be in excess of 0.29 percent expressed as calcium oxide. The sodium hydroxide solution added to the crude phosphoric acid should contain an amount of sodium silicate insufficient to precipitate the fluorine of the crude phosphoric acid, yet sufficient to aid the precipitation.

As was stated, the function of the sodium hydroxide is to provide the sodium ions necessary to produce the sodium silico fluoride. The reaction involves a neutralization of the hydrofluosilicic acid present in the crude phosphoric acid. While the sodium ions of the sodium silicate react in the same manner as the sodium ions of the sodium hydroxide, as was pointed out above, an increase in the amount of sodium silicate is to be avoided. The additional silicate tends to jell when the phosphoric acid is concentrated. Also sodium ions from the sodium hydroxide are much less costly than the sodium ions from sodium silicate.

In each of the folowing examples, crude phosphoric acids are utilized which have a fairly uniform fluorine content since the acid was in each case manufactured from a similar phosphate rock source. Obviously, acids prepared from phosphate rocks taken from other sources will vary somewhat in their fluorine impurities. To apply the method to other phosphate rocks it is necessary to make the calculations outlined above for fluorine. Therefore, the examples are illustrative of the invention but are not to be construed as placing limitations on the scope other than as are set forth in the appended claims.

*Example 1*

1000 gallons of crude 27.02 percent $P_2O_5$ phosphoric acid on an absolute basis at ambient temperatures produced by the "wet" process were first analyzed for total sulfate ion content. Sulfuric acid concentration was 0.5 percent. Sufficient sulfuric acid was added to increase the sulfuric acid concentration to 1.5 percent of the phosphoric acid. Crystals of calcium sulfate settled out. The phosphoric acid was clairified by decantation. The clarified phosphoric acid contained 0.29 percent calcium, measured as calcium oxide.

The clarified phosphoric acid was then flowed into a reactor. It was determined that fluorine impurities amounted to 2.26 percent of the crude phosphoric acid. A reagent mixture comprising 21.9 gallons of 49.9° Bé. (50% NaOH) sodium hydroxide and 5.7 gallons of 42° Bé. sodium silicate and 27.6 gallons of water was added to the phosphoric acid. The amount of sodium hydroxide utilized resulted in the addition of 0.14 pound of sodium hydoxide per gallon of phosphoric acid; this was sufficient to react with most of the fluorine impurities. The amount of sodium silicate was 0.025 pound per gallon of phosphoric acid. The solutions were reacted for about 20 minutes resulting in the precipitation of sodium silico fluoride. The mixture was then flowed into a settling tank from whence, after 20 minutes, the precipitated sodium silico fluoride was removed as a slurry containing 25–45% solid material. The defluorinated acid was removed from the upper portion of the settling tank. The slurry was pumped into a filter so that the entrained phosphoric acid could be removed. The wet sodium silico fluoride was then dried into a finished product.

*Example 2*

The sulfate ion content of 1000 gallons of crude 27.02 percent $P_2O_5$ phosphoric acid was determined in accordance with the method above. The sulfuric acid concentration was increased to 0.99 percent of the phosphoric acid. Some calcium sulfate settled out of the phosphoric acid solution. However, after filtering out the precipitated calcium sulfate, the acid contained a higher calcium percentage than was found in Example 1, 0.86 percent of the phosphoric acid solution.

The phosphoric acid, freed of the precipitated calcium sulfate and having the same quantity of fluorine impurity was then subjected to the identical treatment as disclosed in Example 1. After 20 minutes in the settling tank, the precipitate was of a flocculent nature and did not settle readily. In addition, the sodium silico fluoride precipitate was not satisfactory in that it was only separable from the phosphoric acid with difficulty.

*Example 3*

1000 gallons of crude 27.02 percent $P_2O_5$ phosphoric acid, taken from the same batch as the acid of Example 1, was clarified in the manner shown in Example 1.

The clarified phosphoric acid was then charged into a reactor. 21.9 gallons of 49.9° Bé. sodium hydroxide and 1.1 gallons of 42° Bé. sodium silicate and 23 gallons of water were added to the phosphoric acid. The amount of sodium hydroxide utilized resulted in the addition of 0.14 pound of sodium hydroxide per gallon of 27.02 percent phosphoric acid and the amount of sodium silicate was approximately 0.005 pound per gallon of phosphoric acid. The mixture is further treated in the same manner as in Example 1.

*Example 4*

1000 gallons of crude 35.00 percent $P_2O_5$ phosphoric acid at ambient temperatures after sulfate ion analysis had its sulfate ion concentration adjusted to 2.5 percent of the crude phosphoric acid. The phosphoric acid was then clarified in the same manner as outlined in Example 1. The resulting acid contained 0.17 percent calcium compounds expressed as calcium oxide.

The clarified phosphoric acid containing approximately the same amount of fluorine impurity as in the above examples was then treated with the same quantities of 49.9° sodium hydroxide, 42° Bé. sodium silicate reagent and water that were disclosed in Example 1.

The above examples illustrate batch operations, but, following the phosphoric acid clarification step, the process may be carried out continuously. This is accomplished by controlling the sodium hydroxide and sodium silicate reagent so that the pounds of each compound of the reagent added to the phosphoric acid are in a range of 0.005 and 0.025 pound of sodium silicate and about between 0.14 and 0.20 pound of sodium hydroxide per gallon of phosphoric acid for the specific phosphoric acid used here. The continuous system could be adapted for many varieties of phosphate rock keeping in mind the necessity for calculating the fluorine impurities and sulfate ions in the phosphoric acid utilized. In a continuous system, the reagent mixture is first prepared and proportioned into a reactor into which the rate of phosphoric acid also is controlled. From the reactor, the phosphoric acid mixture is charged into a thickener. From the thickener the sodium silico fluoride is removed as a thickened slurry, the phosphoric acid being removed therefrom by a continuous centrifuge or by some other suitable means. The phosphoric acid removed is then conducted to a storage unit to await final concentration. Lastly, the sodium silico fluoride is dried.

*Example 5*

This example is included to illustrate a continuous method for processing crude phosphoric acid (such as is illustrated on the accompanying flowsheet). The sodium hydroxide-sodium silicate reagent was prepared by conducting 17 parts 49.9° Bé. sodium hydroxide and 1 part 40.9° Bé. sodium silicate into a mixer. This solution is further diluted by adding 18 parts water. This reagent mixture is preferably utilized immediately since it is subject to decomposition when stored. Crude 27.02 percent $P_2O_5$ phosphoric acid has its sulfate ion concentration adjusted so as to contain 2.06 percent sulfuric acid. From the flowsheet it is seen that sulfuric acid and phosphoric acid is charged into a mixer from whence the acid mixture is conducted into a settling tank where the calcium sulfate precipitate is permitted to settle out. The clarified phosphoric acid is decanted and then flowed to a storage unit. The clarified acid at this point contains 0.25 percent calcium oxide.

The prepared sodium hydroxide-sodium silicate reagent is charged into a 2,000 g.p.m. reactor at the rate of 2.65 g.p.m. while at the same time the clarified phosphoric acid is flowrated into the reactor at the rate of 60 g.p.m. The amount of sodium silicate added is approximately 0.005 pound per gallon of phosphoric acid. The mixture comprising sodium silico fluoride precipitate and phosphoric acid is flowed into a 10′ x 3′ thickener. The precipitate is removed from the bottom as a slurry at 5 g.p.m. comprising 25–45 percent solids. The defluorinated acid is removed to storage and for concentration. The slurry is filtered in order to separate the entrained acid from the solid sodium silico fluoride. The precipitate is then dried.

It is seen from the examples that when the calcium oxide concentration remaining in the phosphoric acid after the removal of the calcium precipitate is not less than about 0.29 percent of the crude phosphoric acid, the sodium silico fluoride precipitate is filterable only with difficulty. In Example 2, the calcium concentration was 0.86 percent of the crude phosphoric acid. In this example the resulting sodium silico fluoride did not meet the specifications of this invention. A low sulfate ion concentration, i.e., of somewhat below 1.5 percent, results in a phosphoric acid having sufficient calcium compounds in solution to interfere with the formation of a readily filterable sodium silico fluoride. These calcium compounds are expressed as calcium oxide. The following table shows the percentage of calcium oxide in solution when various sulfate ion concentrations are utilized:

| Sulfate ion concentration, percent | Calcium oxide remaining in solution, percent |
|---|---|
| 0.99 | 0.86 |
| 1.50 | 0.29 |
| 2.06 | 0.25 |
| 2.50 | 0.17 |

By reacting sodium hydroxide solution containing a small amount of sodium silicate with properly clarified "wet" process crude phosphoric acid containing between about 1.5–2.5 percent sulfate ions the fluorine impurities may be removed as sodium silico fluoride precipitate. The precipitate is easily filtered from the phosphoric acid and sodium silico fluoride slurry. The process is economical since the cheap sodium ions of sodium hydroxide are used rather than the more expensive sodium ions of sodium silicate to accomplish the actual fluoride impurity precipitation. The sodium silicate facilitates the formation of a precipitate which is easily filterable. Little or no valueless sodium phosphate is produced since no excess of sodium hydroxide is necessary to carry out this process. Finally, a phosphoric acid is produced which is relatively free of fluorine impurities.

The present method is applicable to all crude phosphoric acid produced by the "wet" process which contains fluorine impurities, such impurities being generally, hydrofluosilicic acid.

Obviously many modifications and variations of the invention as hereinbefore set forth may be made without departing from the spirit and scope thereof, and therefore only such limitations should be imposed as are indicated in the appended claims.

We claim:

1. The process for making sodium silico fluoride which comprises: adding sulfuric acid to crude phosphoric acid produced by the "wet" process, said crude acid containing fluorine, whereby to raise the sulfate ion concentration to at least about 1.5 percent based on the crude phosphoric acid, separating the precipitated calcium sulfate and thereafter adding thereto a mixture of sodium hydroxide and a small amount of sodium silicate whereby to precipitate said fluorine as sodium silico fluoride, said sodium hydroxide being in an amount sufficient to precipitate substantially all of the fluorine as sodium silico fluoride in the phosphoric acid and said sodium silicate being in an amount of between about 0.005 and 0.025 pound per gallon of said crude phosphoric acid.

2. The process for making sodium silico fluoride which comprises: adding sulfuric acid to crude phosphoric acid produced by the "wet" process, said crude acid containing fluorine, whereby to raise the sulfate ion concentration to between about 1.5 to 2.5 percent based on the crude phosphoric acid, separating the precipitated calcium sulfate and thereafter adding thereto a mixture of sodium hydroxide and sodium silicate, said sodium hydroxide being in an amount sufficient to precipitate substantially all of the fluorine as sodium silico fluoride in the phosphoric acid and said sodium silicate being in an amount of between about 0.005 and 0.025 pound per gallon of said crude phosphoric acid.

3. The process for making sodium silico fluoride which comprises: adding sulfuric acid to crude phosphoric acid produced by the "wet" process, said crude acid containing fluorine in an amount of between 2.0 and 2.5 percent of the crude phosphoric acid, whereby to raise the sulfate ion concentration to between about 1.5 to 2.5 percent based on the crude phosphoric acid, separating the precipitated calcium sulfate and thereafter adding thereto a mixture of sodium hydroxide and sodium silicate, whereby to precipitate said sodium silico fluoride, the amount of said sodium hydroxide being in the range of about 0.14 to 0.20 pound per gallon of phosphoric acid based upon the amount of fluorine and the amount of sodium silicate being between about 0.005 and 0.025 pound per gallon of phosphoric acid.

4. The process for making sodium silico fluoride which comprises: adjusting the sulfate ion content of crude phosphoric acid produced by the "wet" process, said crude acid containing fluorine, to between about 1.5 to 2.5 percent based on the crude phosphoric acid, separating precipitated calcium sulfate and adding thereto a mixture of sodium hydroxide and sodium silicate, whereby to precipitate said sodium silico fluoride, said sodium hydroxide being in an amount of between about 0.14 to 0.20 pound per gallon of phosphoric acid based upon the amount of fluorine, said sodium silicate being between about 0.005 to 0.025 pound per gallon of the crude phosphoric acid.

5. The process for removing fluorine from phosphoric acid produced by the "wet" process, said fluorine being in an amount of between 2.0 and 2.5 percent of the crude phosphoric acid, which comprises: adding sodium hydroxide and sodium silicate to crude phosphoric acid, whereby to precipitate said fluorine as sodium silico fluoride, said sodium hydroxide being in an amount sufficient to precipitate substantially all of the fluorine and said sodium silicate being in an amount of between about 0.005 to 0.025 pound per gallon of said crude phosphoric acid.

6. The process of claim 5 wherein the amount of sodium hydroxide is in the range of about 0.14 to 0.20 pound per gallon of crude phosphoric acid based upon the fluorine content.

References Cited in the file of this patent
UNITED STATES PATENTS

| | | |
|---|---|---|
| Re. 19,045 | Larsson | Jan. 16, 1934 |
| 1,456,594 | Howard | May 29, 1923 |
| 1,487,205 | Carothers et al. | Mar. 18, 1924 |
| 1,601,208 | Gerber | Sept. 28, 1926 |
| 2,013,970 | Moore | Sept. 10, 1935 |
| 2,636,806 | Winter | Apr. 28, 1953 |